Nov. 6, 1923.                                          1,473,398
                        C. S. BURTON
             DETACHABLE TRACTION LUG FOR TRACTOR WHEELS
                Original Filed May 31, 1919    4 Sheets-Sheet 1
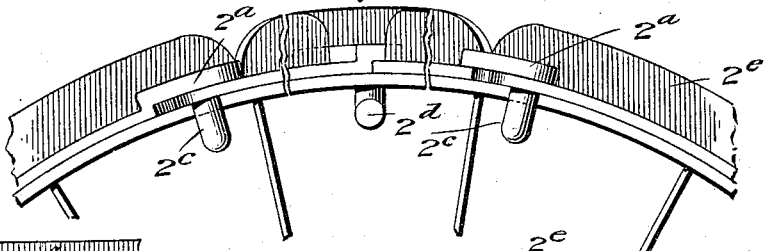
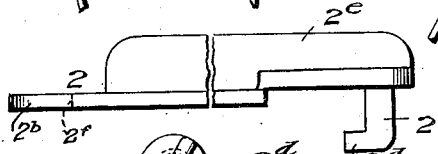
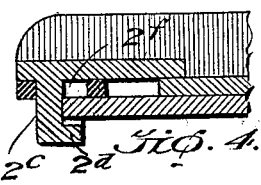
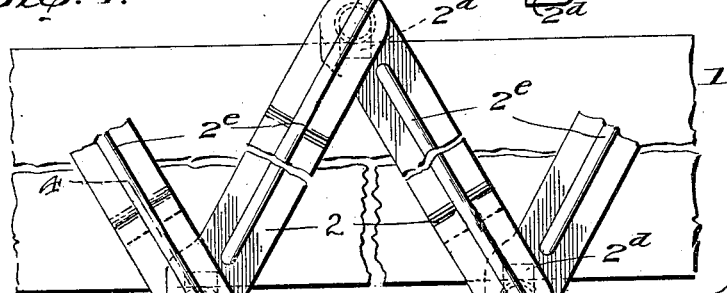
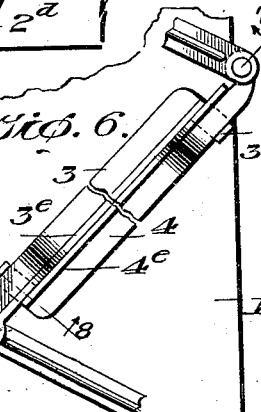
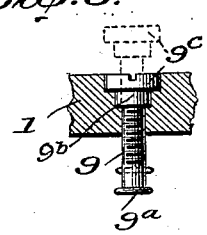
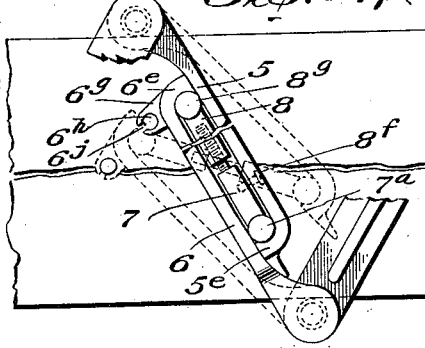
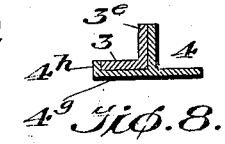
Witness                                            Inventor
                                                Charles S. Burton
              By                                Burton & Burton
                                                  his Attorneys Nov. 6, 1923. 1,473,398
C. S. BURTON
DETACHABLE TRACTION LUG FOR TRACTOR WHEELS
Original Filed May 31, 1919   4 Sheets-Sheet 2
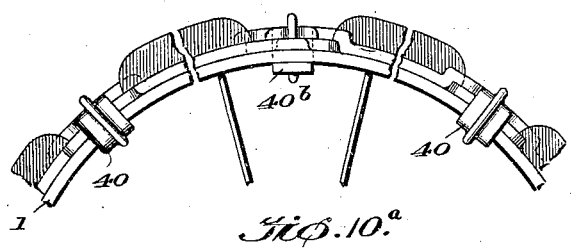
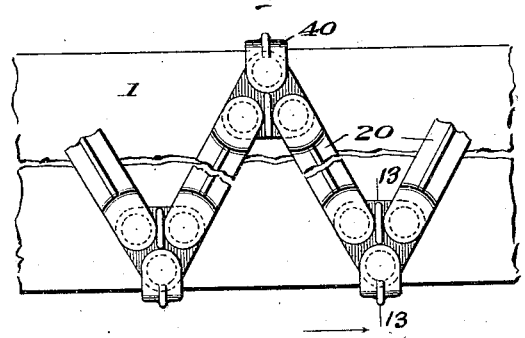
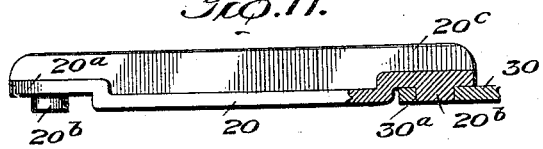
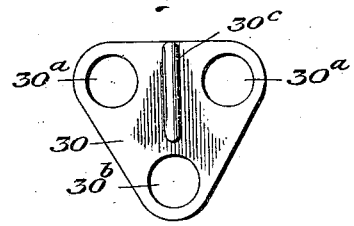
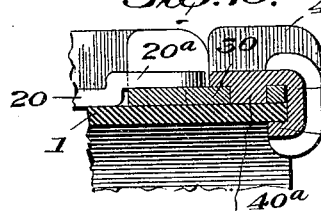
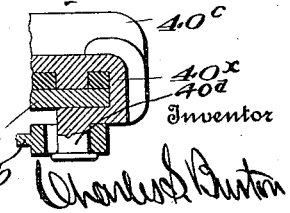

Nov. 6, 1923.                                    1,473,398
                     C. S. BURTON
       DETACHABLE TRACTION LUG FOR TRACTOR WHEELS
          Original Filed May 31, 1919    4 Sheets-Sheet 3
Fig. 15
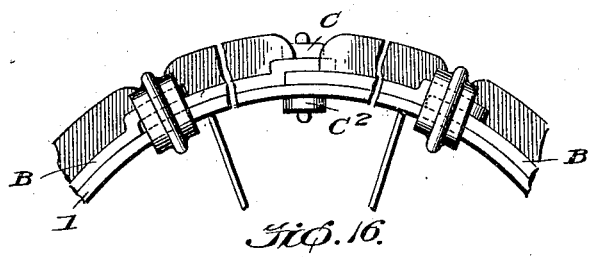
Fig. 16.
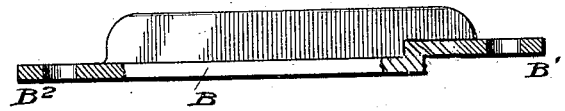
Fig. 17.
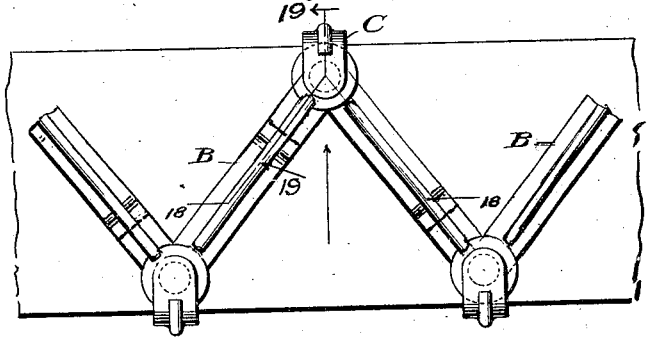
Fig. 18.
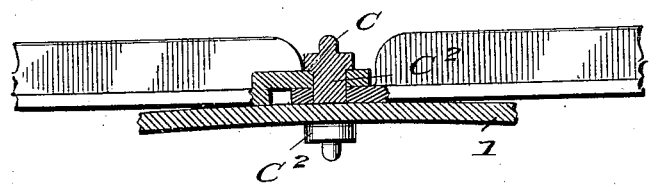
Fig. 19.    Fig. 20
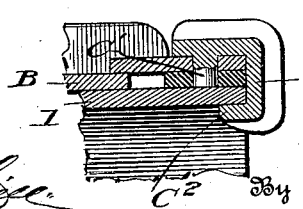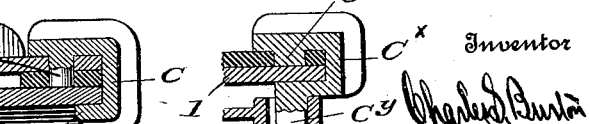

Nov. 6, 1923.                                                    1,473,398
                        C. S. BURTON
              DETACHABLE TRACTION LUG FOR TRACTOR WHEELS
              Original Filed May 31, 1919     4 Sheets-Sheet 4
Fig. 21.
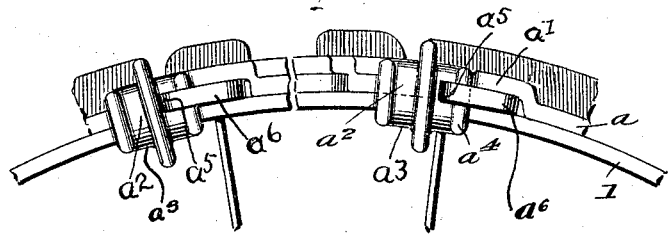
Fig. 22.
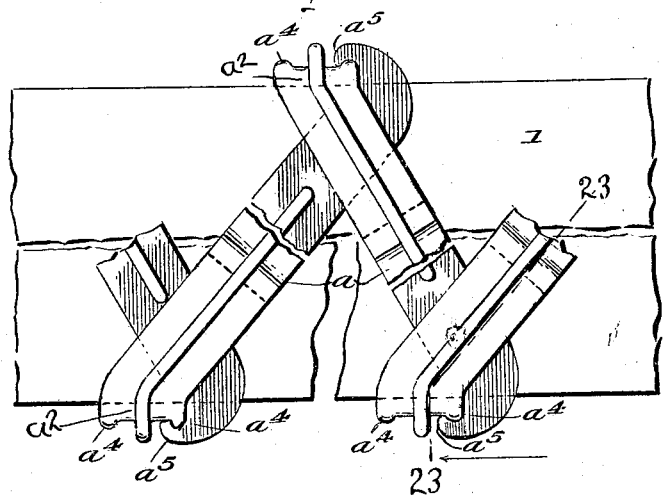
Fig. 24.    Fig. 23.    Fig. 25.
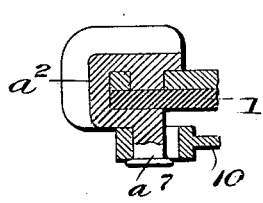 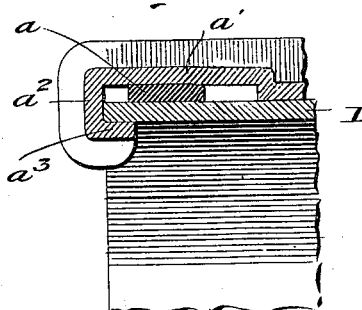 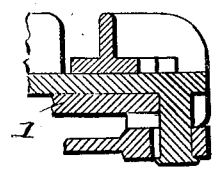
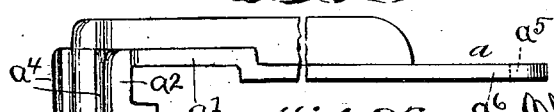
Fig. 26.
Witness                                            Inventor
                                              Charles S. Burton
                                           By Burton & Burton
                                                    his Attorneys Patented Nov. 6, 1923.

1,473,398

UNITED STATES PATENT OFFICE.

CHARLES S. BURTON, OF OAK PARK, ILLINOIS.

DETACHABLE TRACTION LUG FOR TRACTOR WHEELS.

Application filed May 31, 1919, Serial No. 300,969. Renewed April 7, 1923.

*To all whom it may concern:*

Be it known that I, CHARLES S. BURTON, a citizen of the United States, residing at Oak Park, in the county of Cook and State of Illinois, have invented certain new and useful Improvements in Detachable Traction Lugs for Tractor Wheels, of which the following is a specification, reference being had to the accompanying drawings, forming a part thereof.

The purpose of this invention is to provide an improved construction of detachable lugs for tractor wheels, of the general character constituting a flexible zigzag system of lugs extending around the rim of the wheel and adapted to be tightened against the opposite edges of the rim by being drawn tight circumferentially of the wheel. It consists in the elements and features of construction shown and described, as indicated in the claims.

In the drawings:—

Figure 1 is a side elevation of a segment of a tractor wheel rim having lugs embodying this invention.

Figure 2 is a plan view of a similar segment.

Figure 3 is a section of the form shown in Figures 1 and 2.

Figure 4 is a section at the line, 4—4, on Figure 2.

Figure 5 is a detail section through the wheel rim at a point at which there is mounted a bolt for initially holding the first lug of the system in assembling the system of lugs on the wheel rim, the bolt being shown fully set down into the rim out of the position of use for the purpose mentioned, being in the position occupied when the wheel is in travel either with or without lugs.

Figure 6 is a plan view of a special two-membered lug for connecting the first and last regular lugs of the system, said special lug being shown upon a short segment of the wheel rim, together with the end portions of the adjacent first and last lugs of the system.

Figure 7 is a section at the line 7—7 on Figure 6, showing the tightening device co-operating with said two-membered lug.

Figure 8 is a detail section at the line 8—8 on Figure 6.

Figure 9 is a plan view of a different form of tightening device which involves a modified form of the two-membered lug.

Figure 10 is a side elevation of a segment of a tractor wheel rim provided with traction lugs of a modified form of this invention.

Figure 10ª is a plan view of a similar segment.

Figure 11 is a partly sectional edge elevation of one of the tractor lugs of the form shown in Figures 10 and 10ª, section being made through the pivot of one end of the lug to the next element of the system.

Figure 12 is a plan view of said next adjacent element, being a connector for consecutive lugs.

Figure 13 is a detail section at the line 13—13 of Figure 10.

Figure 14 is a detail section corresponding to the right hand end portion of Figure 7 in the modified form of the invention shown in Figures 9 to 13 inclusive.

Figure 15 is a side elevation of a segment of a tractor wheel rim equipped with a second modified form of this invention.

Figure 16 is a partly sectional edge elevation of one of the traction lugs of said second modified form, section being made through the end portions comprising the pivot openings.

Figure 17 is a plan view of the segment shown in Figure 15.

Figure 18 is a section at line 18—18 on Figure 17.

Figure 19 is a detail section at the line 19—19 on Figure 17.

Figure 20 is a detail section corresponding to the righthand end of Figure 7 in this second modified form, shown in Figures 15 to 18 inclusive.

Figure 21 is a side elevation of a segment of a tractor wheel having traction lugs embodying a third modification of this invention.

Figure 22 is a plan view of a similar segment.

Figure 23 is a detail section at the line 23—23 on Figure 22.

Figure 24 is a detail section of the form shown in Figures 22 and 23 at a plane corresponding to that of the left hand end of Figure 7 in this third modification.

Figure 25 is a detail section of the form shown in Figures 22 and 23 at a plane corresponding to that of the right hand end of Figure 7.

Figure 26 is a side elevation of one of the tractor lugs of the form shown in Figure 22.

In all the forms shown in the drawings, 1, represents the tread rim of the tractor wheel which when stripped of the lugs presents a smooth flat face to the roadway, that is a face devoid of irregularities or transverse curvature. In all the figures illustrating the different forms of traction lugs, except the side elevations of the segment of the wheel having the lugs mounted upon it, the slight curvature of the lugs lengthwise which would be involved in their seating obliquely upon the tread rim, is disregarded, being too slight for accurate representation; but it is to be understood that the lugs are preferably in practice slightly curved lengthwise to accommodate the curvature of the wheel rim, across which they extend at an angle which may vary from 45° a few degrees either way.

In the form shown in Figures 1 to 7 inclusive,—the regular lugs 2 being shown in Figures 1, 2 and 3,—these lugs are all identical in form (with the exception of the terminal of one of them as hereinafter described), each lug having at one end an upraise $2^a$ under which the end $2^b$, of the adjacent lug enters, said entering end $2^b$ being of the form of the opposite end of the first mentioned lug; and said upraised end has a pivot stud or pintle $2^c$ projecting down for entering a pivot opening $2^f$ which is provided in the end $2^a$ of the adjacent lug, (the opposite end of the first lug being similarly provided). This pivot stud $2^c$ has an inwardly hooked end as shown at $2^d$, and the eye or pivot aperture $2^f$ is elongated in a direction which is directly transverse to the wheel rim when the lug is in its normal oblique position on the rim. Upon considering this construction of these lugs for pivoting them together successively to form the complete system to encompass the wheel rim, it will be seen that upon the first lug being in any manner supported against or upon the wheel rim, the next lug being engaged with it by entering the pivot stud of the first through the pivot opening of the second, the two lugs being set at approximately the angle to each other which they will occupy on the tread rim, the hook end $2^d$ of the pivot stud $2^c$ may be engaged under the wheel rim; and then the second lug being swung toward a directly transverse position on the wheel rim to carry its own pivot stud sufficiently beyond the opposite margin of the wheel rim for entering it into the pivot opening of a third lug, the pivotal junction thus produced may be swung back to engage the hook $2^d$ of said second lug also under the edge of the wheel rim; and thus continuing the process by engaging lug after lug until the entire wheel rim is encompassed there will be formed on the tread rim a zigzag system of traction lugs each engaged with the rim, at one edge, alternate lugs being engaged with the opposite edges by the hook terminals $2^d$ of the pivot studs, and remaining safely thus engaged as long as the zigzag system is held sufficiently extended and not allowed to collapse circumferentially of the wheel. Obviously for practical securement of this system on the wheel rim, means must be provided connecting the first and last lugs of the system in a manner permitting them to be drawn together to take up the slack or play of the entire system. This means consists of a special lug made in two parts and thereby adapted to be contracted and extended, and provided with means for contracting and extending it, as required by the variations which cannot be entirely avoided in the circumference of the tread rim and aggregate length of the lugs and play at their pivotal connections. Two forms of extensible and contractible special lugs are shown in the drawings. In Figure 4 this special lug comprises two members 5 and 6, the member 5 having the termination for pivotal connection correspoding to the end $2^b$ of the standard lugs 2 and the member 6 having the termination for pivotal connection corresponding to the opposite end of the lug 2, that is with the upraise $2^a$ and the pivot stud $2^c$ with its hook end $2^d$. Each of the members 5 and 6 opposite the pivoted end is furnished with a hook, said hooks being indicated at $5^e$ and $6^e$ respectively, said hooks facing back toward the pivoted end of the member. When these two special lug members 5 and 6 are connected respectively to the first and last standard lugs of the system, they may be swung toward each other and lie parallel as seen in Figure 4, the hook end of each lodging against the side of the other and the two hooks facing each other. For occupying the interval between the two facing hooks and shortening the special lug formed by these two members, or permitting it to be lengthened as may be required for properly tightening up the lug system on the wheel rim I have provided a two part extensor, consisting of the members 7 and 8, one having a threaded bore and the other a threaded tang for screwing into the bore, to lengthen or shorten the extensor. The ends of said members 7 and 8 opposite the threaded ends are formed for seating in the hooks $5^e$ and $6^e$, having for that purpose cylindrical crossheads $7^a$ and $8^a$ fitting the hooks. In practice, upon assembling the lug system on the wheel rim as described, ready for connecting up the first and last lugs by the tightening device, the two members 5 and 6 being connected respectively with the first and last lugs of the system will be themselves connected by the extensor at the dotted line position shown in Figure 4, the extensor being adjusted as to its length so as to properly engage the two hooks $5^e$ and $6^e$ when the two members 5 and 6 are thus somewhat separated and out of their final locking position side by side; and upon this engagement by means of the extensor being effected, any convenient means for swinging the said members 5 and 6 toward each other being applied, the process of thus swinging them together will take up the slack of the system, it being understood that the operator will estimate the slack as closely as possible and adjust the extensor accordingly; but if he over-estimates it and is thereby unable to swing the two members 5 and 6 together with the extensor between them, he will remove the extensor and readjust the two members, which can be done by short distances, a single half turn of the two extensor elements in respect to each other being a minimum adjustment, which permits the use of a very substantial thread in the extensor, such for example as $\frac{1}{8}''$ pitch, which affords the unit of adjustment of $\frac{1}{16}''$. The extensor members have their hooks $5^e$ and $6^e$, positioned with respect to the pivot centers, so that in swinging the two extensor members close together as shown in Figure 4, the line of stress between the two pivots of the extensor in the hooks of the members 5 and 6 is carried past the line of stress between the pivots of said members to the respectively adjacent lugs of the system, thereby producing a locked condition of the coupling. In order, however, to make this locked condition secure against accidental unbuckling of the coupling in road travel, there is provided a screw $8^t$, set through the member 8, in position for engaging a tapped hole in the extensor member which is to be engaged with the hook of that extensor member, when the two extensor members are closed together in locked position.

Another form of tightening device for the lug system is shown in Figure 6 and Figure 7. In this form the special lug comprises two members 3 and 4, which, as illustrated, are each L-shaped in cross section, their horizontal flanges seating on the tread rim and their vertical flanges back to back forming a traction rib. As in the form shown in Figure 4, one of the members, as the member 3, has one end formed for pivoting to the last lug of the system by having the upraise corresponding to $2^a$, of the standard lug, indicated at $3^a$, with respect to the special lug, (see Fig. 7) and having the pivot stud projecting from that upraised end, said pivoted stud in the special lug being shown at $3^c$ Figure 7; the other member 4 has its pivoted end formed correspondingly to the opposite end $2^b$ of the standard lug, as seen at $4^b$ Figure 7, that is having the eye for engagement of the pivot stud and adapted to be entered under the upraised end of the adjacent or last lug of the assembled system. The stud $3^c$ of the member 3, and the similarly indicated pivot stud of the last lug of the assembled system are different in form from the standard pivot studs of the system in that they are longer than amount sufficient to accommodate the head of a turn buckle below or inside of the wheel rim; and preferably also they have instead of the hook end $2^d$ a small head $3^d$ as shown in Figure 7. Each of the members 3 and 4 has an upraise near its pivoted end, that of the member 3 being a mere continuation of the upraise $3^a$ provided for, accommodating the end of the adjacent lug of the system, but that of the member 4 shown at $4^a$ is specially provided for the purpose of this special coupling lug, which is to accommodate a hook terminal of the other member, said hook terminal being shown at $3^g$ and $4^g$ on the members 3 and 4 respectively, extending under the upraise of the other member and having upturned hook ends $3^h$ and $4^h$ for engaging said other member, as clearly seen in Figure 6. It will be observed that this construction permits the two members 3 and 4 to slide longitudinally along each other to the extent of the upraise at $4^a$ and $3^a$ for lengthening and shortening this special two part lug. The turn buckle comprising members 10—10, each having an eye for engaging the elongated pivot stud $3^d$ and their approximate ends oppositely threaded and connected by the buckle member 11, afford the means for extending and contracting the two part lug 3—4, to accommodate the variation in the wheel rim and lugs and tighten the lug system on the wheel rim.

A modified form of lug and connections is shown in Figures 9 to 14 inclusive. In this form all the traction lugs 20, (except the coupling lug) are identical in form and each alike at both ends, having the upraise $20^a$, provided with a downwardly projecting pivot stud $20^b$; and the successive lugs of the system are connected together by connectors
30. These connectors 30, is a substantially triangular plate having in each corner a pivot aperture. Two of these apertures $30^a$, $30^a$, receive the pivot studs $30^b$, of the traction lugs to be connected by the connector.
The third pivot aperture $30^b$, receives a pivot stud $40^a$, of a hook member 40, which clasps the connector to the wheel rim 1, said hook member having a hook terminal $40^b$, which engages inside the rim. The lugs 20, are shown provided with an upstanding traction rib $20^c$, extending from end to end of the lug; and the connector plate 30, preferably has also a traction rib $20^c$, upstanding between the pivot aperture $30^a$.

The first and last lugs of the system extending zig-zag about the wheel rim are connected by a two-part coupling lug of either of the forms shown in Figures 4 or 6. When the form shown in Figure 6 is employed the rim engaging end of both members of the coupling lug will be modified in form to conform substantially to the form of the hook 40, such conformation being shown in Figure 14 consisting in extending to the lug members 3 and 4 to form the hook 40$^x$, and terminating that hook with a downwardly projecting pivot stud 40$^d$, for engagement of the turn-buckle member 10.

Another modification of the traction lug system is shown in Figures 15 to 20 inclusive. In this form the traction lugs B, (except the coupling lug) are all alike but differently formed at the two ends, one end having an upraise B$^1$ to accommodate under it the other end B$^2$ of the adjacent lug; and the two lugs are connected together and engaged with the wheel rim 1, by a hook C, which is provided with a pivot stud C$^1$, engaging the pivot apertures of the ends B$^1$ and B$^2$ of the lugs lapped one upon the other, the lapping and engagement of the hook with the lug ends being made when the lug last connected in the system is swung about its pivotal connection already made to a position at which the free end to be connected to the next lug overhangs the margin of the rim enough to permit the hook C$^2$, of the hook member C, to clear the edge of the rim in the process of engaging the pivot stud C$^1$, with the two lug ends to be connected, the lugs being then swung back to engage the hook end C$^2$ inside the tread rim. In this form either form of coupling link may be employed for closing up and tightening the lug system on the wheel rim, the two members of the coupling lug being modified as to their ends for connection with the first and last lugs of the system when the form shown in Figure 6 is employed, as shown in Figure 20. The modification necessary consists in finishing each of the elements 3 and 4 for pivotal connection respectively with the first and last lugs of the system, by terminating them each in a hook C$^x$, having the pivot stud C$^1$, for engaging the adjacent lug of the system and having pivot stud C$^y$, for engagement to the turn-buckle.

A fourth form of this invention is shown in Figures 21 to 23 inclusive. In this form all the traction lugs $a$, are identical in form but differently formed at their opposite ends, one end having an upraise $a^1$, for accommodating under it the plain end $a^6$ of the adjacent lug, and having extended from said upraise a hook $a^2$, having its terminal $a^3$, engaging back of the tread rim 1. The opposite or plain end of the lug is formed with a hook in the plane of the lug, said hook $a^5$, being turned in the direction of the acute angle to be formed between the lug and the lateral edge of the wheel rim, this hook engaging the radially or vertically inturned hook $a^2$, of the adjacent lug as seen clearly in Figure 22. For rendering this hook engagement as safe as possible against slipping, the hook $a^2$, is formed with a marginal bead $a^4$, about which the hook $a^5$, is curved, thus forming a sort of pivotal connection between the two hook features, which facilitates assembling the system of lugs on the wheel rim.

For coupling up the lug system when the lugs are in this form either of the forms of coupling lug shown in Figures 4 or 6 may be employed, suitably modifying their terminals for connection with the first and last lugs of the system. This modification in the case of the form shown in Figure 4 would be obvious consisting merely in terminating one of the members as 5, with a hook like the hook $a^5$, and terminating the other member 6, with a hook like $a^2$. To employ the form shown in Figure 6, the member 3, will be terminated as shown in Figure 24, that is having a hook $a^2$, provided with a pivot stud $a^7$, projecting from its hook end $a^6$, for engaging the turn-buckle member 10. The other member 4, will be terminated as shown in Figure 25, with the hook $a^5$, provided with a downward projecting stud $a^7$, reaching past the edge of the wheel rim for receiving the turn-buckle member 10.

When the form of coupling link shown in Figure 6 is employed or any form using a turn-buckle extending inside the wheel rim, the coupling link will be first placed in position on the wheel rim with the turn-buckle extending across the inside of the rim between two spokes so as to be readily engaged against one spoke for holding the traction lugs in position on the rim while they are being assembled around the rim. When the form of coupling lug shown in Figure 4 is employed other means must be provided for holding the first lug of the system and thereby holding the remainder of the system in position while assembling; and for this purpose the rim has a hole bored in it at any convenient point to receive a bolt 9, as shown in Figure 5, the hole being tapped for the bolt and counter-bored to accommodate the shoulder 9$^b$, and head 9$^c$, so that the bolt may be set in flush with the outer surface of the wheel rim as shown in Figure 5. The bolt will occupy this position when not in service for initially holding the lug system while assembling. When the lugs are to be assembled the bolt 9, will be withdrawn to position shown by dotted line on Figure 5, (the inner end of the bolt being upset after it is inserted through the wheel rim as shown at 9$^a$, to prevent accidental loss) and the member 6, of the coupling lug, which has a projecting lug 6ˢ, at its free end provided with an aperture 6ʰ, of the diameter of the shoulder 9ᵇ, of the bolt 9, with an in-leading opening 9ʲ, equal in width to the diameter of the threaded stem of the bolt 9, will be engaged with the bolt 9 by entering the bolt through the opening 9ʲ and then screwing in the bolt to engage its shoulder 9ᵇ, in the aperture 9ʰ. By this means the member 6, is hung loosely on the wheel rim and may have the first lug of the system connected to it and will support the remainder of the system as it is assembled around the wheel rim. When the assembly is completed and the second member 5, of the coupling lug is connected and the system is ready for tightening, the bolt 9 will be withdrawn sufficiently to disengage the lug member 6; and when the system is tightened up and the wheel is ready for service the bolt 9, will be set back into the rim with its head flush (and may be set tight) so it will be safe against injury during travel.

I claim:—

1. In combination with a traction wheel rim, detachable traction means consisting of traction lugs, pivotally connected together in series and disposed zig-zag on the traction face of the rim, alternate junctions approximating the opposite lateral edges of the rim; hook devices extending from the junctions for engaging said edges, and coupling means for connecting the first and last lugs of the series, consisting each of a two-member lug whose two members lap upon and engage each other, and means for forcibly adjusting the extent of their lap, for extending and contracting said two-member lug.

2. In the construction defined in claim 1 foregoing, the two lapped members of the coupling lug being in contact back to back and having each toward one end an upraise, and toward the other end a transversely projecting hook, the hook of each member being extended under the upraise of the other and slidably engaged therewith, and a contractible connector extending inside the rim opposite the two-membered coupling and connected at its ends respectively with one of the parts involved in the junction of the coupling with the first or last lug of the series.

3. In the construction defined in claim 1 foregoing, the traction lugs being pivotally connected each to the preceding and succeeding lug of the series, at junction points situated beyond the opposite side edges of the wheel rim.

4. In the construction defined in claim 1 foregoing, the traction lugs being connected together substantially at their ends.

5. In combination with a traction wheel rim, detachable traction means consisting of bars pivotally connected together in series and disposed zig-zag on the traction face of the rim, one bar being lapped outside the other at each junction, and the pivots being studs projecting rigidly from the outer-lapped bars through the inner-lapped bars outside the rim; said pivot studs being extended radially of the wheel past the rim edges for stopping the bars thereagainst.

6. In the construction defined in claim 5 foregoing, the pivot studs being hooked inwardly for engaging inside the wheel rim when held laterally against the edge.

In testimony whereof I have hereunto set my hand this twenty-ninth day of May, nineteen nineteen.

CHARLES S. BURTON.